United States Patent [19]

Dean

[11] Patent Number: 5,507,309
[45] Date of Patent: Apr. 16, 1996

[54] PRESSURE DIFFERENTIAL REGULATOR

[75] Inventor: W. Clark Dean, Simsbury, Conn.

[73] Assignee: United Technologies Corporation, Hartford, Conn.

[21] Appl. No.: 498,098

[22] Filed: Jul. 5, 1995

[51] Int. Cl.⁶ ..................................... G05D 11/03
[52] U.S. Cl. ............................. 137/87; 137/312
[58] Field of Search ............................. 137/87, 312

[56] References Cited

U.S. PATENT DOCUMENTS

| | | | |
|---|---|---|---|
| 2,145,114 | 1/1939 | Gibbs | 137/87 |
| 2,770,799 | 11/1956 | Horn | 137/312 X |
| 3,216,441 | 11/1965 | Thorsheim | 137/87 |
| 3,270,762 | 9/1966 | Banning | 137/98 |
| 3,324,872 | 6/1967 | Cloud | 137/98 |
| 3,573,409 | 4/1971 | Jeffrey et al. | 200/81.4 |
| 3,688,790 | 9/1972 | Esten | 137/98 |
| 3,861,642 | 1/1975 | Maddocks | 251/61.1 |
| 3,982,558 | 9/1976 | Ochs | 137/455 |

FOREIGN PATENT DOCUMENTS 1023900  3/1953  France.
2158204  11/1985  United Kingdom.

Primary Examiner—Robert G. Nilson
Attorney, Agent, or Firm—Malcolm J. Chisholm, Jr.

[57] ABSTRACT

An improved pressure differential regulator is disclosed for controlling pressure differentials within a supply source such as an electrolytic cell stack. The regulator is positioned downstream of the supply source and basically includes a first sensing chamber that receives a first fluid from the source; a second sensing chamber that receives a second fluid from the source; a multi-layered diaphragm secured between the first and second sensing chambers; a first contracted sensing chamber outflow restriction valve secured within the first sensing chamber between the diaphragm and a first fluid outlet; and, a second contracted sensing chamber outflow restriction valve secured within the second sensing chamber between the diaphragm and a second fluid outlet. In operation, if a sudden demand of first fluid downstream of the regulator decreases pressure within the first sensing chamber, the relatively higher pressure within the second sensing chamber will cause the multi-layered diaphragm to expand into and therefore contract the first sensing chamber. That causes the first contracted sensing chamber outflow restriction valve to restrict flow of the first fluid out of the first sensing chamber and supply source, thereby regulating the pressure differential between the first and second fluids within the supply source. The multi-layered diaphragm defines first and second leakage cavities to direct leaked fluids out of the regulator without unsafe mixing of the leaked fluids.

19 Claims, 4 Drawing Sheets

PRESSURE DIFFERENTIAL REGULATOR

TECHNICAL FIELD

The present invention relates to regulators for controlling pressure differentials between two fluids, and especially relates to an improved pressure differential regulator for controlling pressure differentials between fluids in a working environment of an electrochemical cell.

BACKGROUND OF THE INVENTION

Electrochemical cells, such as electrolytic cell stacks used in advanced electrolytic oxygen generators in submarines, space craft, etc., are commonly used to convert water into diatomic hydrogen and oxygen gas. It is critical in such generators to maintain pressure differentials within a very limited range within the cells themselves. Modern electrolytic cells and/or cell stacks operate at increasingly higher total operating flow rates and/or pressures to achieve optimal performance. Additionally, modification of traditionally submarine-based electrolytic cell stacks for efficient use in space craft requires that overall weights and volumes of the cell stacks be reduced as much as possible.

In use of such a cell stack for generation of oxygen and hydrogen gas, the rates of production of oxygen and hydrogen gas relative to each other are typically constant. However, because those product gases are compressible, their operating pressures within the cells and/or cell stack are a function of use of each gas downstream of the stack, and the relative use of each gas is variable. For example in a submarine or space craft, there may be a sudden and critical demand for an increased usage of oxygen gas, while the requirement for hydrogen gas remains constant. Consequently, operating pressures of the oxygen may suddenly decrease upstream of the demand, within the cell stack, thereby increasing the pressure differential across the cells of the stack. Additionally, such a cell stack is capable of catastrophic failure if a pressure differential is sufficient to cause a breach in ordinary barriers within the cells between the product gases. Under ordinary high operating pressures of modern electrolytic cell stacks, mixing of hydrogen and oxygen gas as a result of such a failure could easily be at the stoichiometric quantities required to produce an explosion. Moreover, even at pressure differentials far less than that which can cause a breach, excess pressure differentials as low as a few inches of water can force an electrolyte (such as a potassium hydroxide—water solution) through a cell membrane causing the electrolyte to flow out of the cell into gas product distribution lines, requiring shutdown for clean up and/or repair.

Consequently it is critical to maintain the pressure differential of the product gases in an electrolytic cell and/or cell stack within a very narrow acceptable range. Current systems for regulating pressure differentials within such cell stacks have relied upon an electronic system demand regulator that controls the output of a first side of the cell stack (e.g., the oxygen side), while the output of a second side (e.g., the hydrogen side) is controlled by a standard delta-p regulator that references the flow rate of the first side. Additionally, in the event the system demand and delta-p regulators allow an excess pressure differential beyond an acceptable range, modern electrolytic cell stack systems use separate accumulator tanks for each side to immediately compensate for such an excess pressure differential. The accumulator tanks inject into the side experiencing a lower relative pressure an adequate amount of gas to return the pressure differential to within the acceptable range.

Use of the system control regulator, delta-p regulator, accumulator volume tanks, and the standard piping and valve hardware, and switch mechanisms that operate such current systems for regulating pressures within modern electrolytic cell stacks adds enormous weight, volume, risk and cost factors to efficient operation of modern electrolytic cells and/or cell stacks.

Additionally, there are many pressure differential regulators for more conventional, non-electrolytic cell fluid delivery systems that control pressure differentials between differing fluids within such conventional systems. For example, in large hotels having a plurality of shower heads that mix hot and cold water for personal bathing, a sudden drop in the flow rate of the cold water must be immediately compensated for by a commensurate drop in the flow rate of the hot water to avoid scalding a user of the shower. Similarly, beverage dispenser heads that mix syrup, water and carbon dioxide gas under pressure, must mix the gas with the syrup and water at a constant pressure, while the pressure of the gas as delivered from a storage tank is constantly declining.

Known pressure differential regulators for these conventional systems maintain the pressure differential of differing fluids in such systems within a specific range through use of a single pressure sensing diaphragm positioned between two separate pressure sensing chambers. Two separate valves are placed on opposed sides of the diaphragm so that a separate valve controls flow through each chamber. Such regulators work by structuring the relationship between each valve and the pressure sensing diaphragm so that an increase in relative pressure within a first chamber results in a simultaneous decrease in flow rate out of that first chamber and an increase in flow rate out of the second chamber.

U.S. Pat. No. 3,688,790 to Esten for a "Pressure Balance Valve" shows a typical regulator for a multiple shower head environment, wherein the relationship between the pressure sensing diaphragm, two chambers and two valves is disclosed. As shown in the Esten Patent, when the pressure of a fluid in a first chamber increases relative to the pressure of a fluid in the second chamber, the diaphragm expands into and contracts the internal volume of the second chamber, thereby causing a first valve affixed to a first side of the diaphragm and projecting into the first chamber to adjust to restrict flow out of the first chamber, while simultaneously causing a second valve affixed to an opposed second side of the diaphragm and projecting into the second chamber to adjust to increase flow out of the second chamber.

For example, in a regulator such as the "balance valve" shown in the Esten Patent, cold water may flow through a first chamber and hot water may flow through a second chamber and, after leaving the regulator, the cold and hot water are next mixed together downstream of the regulator and then discharged through a shower head. If a sudden drop in pressure or flow rate of cold water into the first chamber occured as a result of a demand for cold water upstream of the regulator (e.g., via toilet flushing, etc.), the diaphragm would sense the change in relative pressures between the first and second chambers and expand into the first chamber and away from the second chamber to enhance flow of cold water out of the first chamber, while simultaneously restricting flow of hot water out of the second chamber. Because the valves within sensing chambers of conventional pressure differential regulators act to enhance outflow of fluids out of their sensing chambers upon contraction of the sensing chambers, it is appropriate to refer to such valves as contracted sensing chamber outflow enhancement valves, as will be done hereinbelow.

As is readily apparent, such conventional pressure differential regulators are structured to control pressure differentials between differing fluids downstream of the regulators as a result of fluctuations of pressures and/or flow rates upstream of the regulators. Therefore, positioning such regulators downstream of the cell stacks would have the effect of increasing pressure differentials within the cell stack upon a sudden downstream decrease in pressure in one side of the regulator output. Moreover, because source materials for electrolytic cells and/or cell stacks are typically liquid and product materials are differing gases, positioning conventional pressure differential regulators upstream of the cell stacks, in the flow of the liquid phase of the source materials, cannot effect pressure differentials within the cell stack, or in individual cells. Consequently, conventional pressure differential regulators are not capable of controlling pressure differentials within an electrolytic cell or electrolytic cell stack.

Accordingly, it is the general object of the present invention to provide an improved pressure differential regulator that overcomes problems of the prior art.

It is a more specific object to provide an improved pressure differential regulator that overcomes excess weight, volume, risk and cost problems of known systems for regulating pressure differentials in electrolytic cells and/or cell stacks.

It is another specific object to provide an improved pressure differential regulator for controlling pressure differentials between differing product fluids within an electrolytic cell and/or cell stack that minimizes the risk of the differing product fluids of the cell and/or cell stack mixing with each other.

It is another object to provide an improved pressure differential regulator for controlling pressure differentials between differing fluids upstream of the regulator in response to demands for the fluids downstream of the regulator.

It is yet another object to provide an improved pressure differential regulator for electrolytic cells and/or cell stacks that may be economically encased within a single housing.

The above and other advantages of this invention will become more readily apparent when the following description is read with the accompanying drawings.

DISCLOSURE OF THE INVENTION

An improved pressure differential regulator is disclosed for controlling pressure differentials within a supply source such as an electrolytic cell that supplies different fluids at variable pressures through a plurality of discharge ports. In a preferred embodiment, the supply source is an electrolytic cell stack within an oxygen generator that converts water to a first fluid, being diatomic oxygen, and a second fluid, being diatomic hydrogen, and transfers the first and second fluids out of the generator through separate first and second discharge ports. In accordance with the present invention, the improved differential pressure regulator comprises a first sensing chamber in fluid communication with the first discharge port for receiving the first fluid; a second sensing chamber in fluid communication with the second discharge port for receiving the second fluid; a multi-layered diaphragm secured between the first and second sensing chambers; a first contracted sensing chamber outflow restriction valve secured within the first sensing chamber adjacent the multi-layered diaphragm; a second contracted sensing chamber outflow restriction valve secured within the second sensing chamber adjacent the multi-layered diaphragm; a first fluid outlet in fluid communication with the first contracted sensing chamber outflow restriction valve; a second fluid outlet in fluid communication with the second fluid contracted sensing chamber outflow restriction valve; a first leakage cavity defined between a first layer of the multi-layered diaphragm and a central layer of the diaphragm, the first layer being adjacent the first sensing chamber; a second leakage cavity between a second layer of the diaphragm and the central layer of the diaphragm, the second layer being adjacent the second sensing chamber; a first leakage monitoring device in fluid communication with the first leakage cavity; and a second leakage monitoring device in fluid communication with the second leakage cavity.

In operation of the improved pressure differential regulator the first fluid passes out of the supply source through the first discharge port and into the regulator through the first sensing chamber, the first contracted sensing chamber outflow restriction valve, and out of the regulator through the first fluid outlet at a rate controlled by the first contracted sensing chamber outflow restriction valve. The second fluid, likewise, passes out of the supply source through the second discharge port and into the regulator through the second sensing chamber, the second contracted sensing chamber outflow restriction valve, and out of the regulator through the second fluid outlet at a rate controlled by the second contracted sensing chamber outflow restriction valve. If a sudden demand and usage of the first fluid downstream of the regulator reduces the pressure of the first fluid adjacent the first contracted sensing chamber outflow restriction valve and therefore within the first sensing chamber, the relatively higher pressure of the fluid in the second sensing chamber will cause the multi-layered diaphragm to expand into and thereby contract the first sensing chamber. That movement of the diaphragm will also cause the adjacent first contracted sensing chamber outflow restriction valve to decrease the flow rate of the first fluid out of the first sensing chamber, and will simultaneously cause, by the same movement of the multi-layered diaphragm, the second contracted sensing chamber outflow restriction valve to increase the flow rate of the second fluid out of the second sensing chamber, thereby equalizing the pressure differential between the first and second fluids upstream of the regulator, within the supply source. In the event of a failure of the first or second layers of the multi-layered diaphragm, the first or second fluids pass into the respective first or second leakage cavities and out of the regulator through the first or second leakage monitoring devices, with the central layer preventing mixing of the first and second fluids.

BEST MODE FOR CARRYING OUT THE INVENTION

Figure 1:
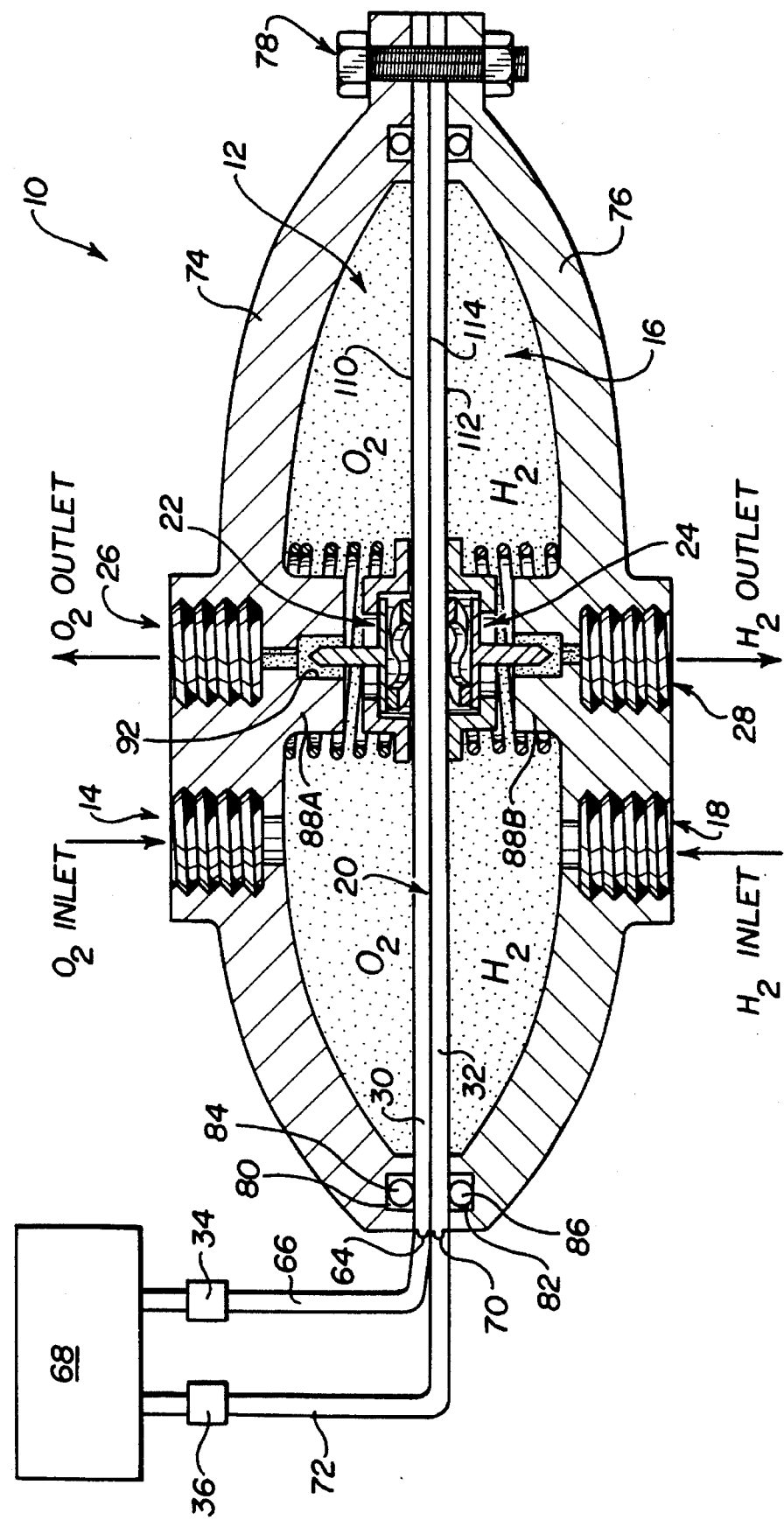
FIG. 1 is a cross-sectional view of an improved pressure differential regulator constructed in accordance with the present invention showing a multi-layered diaphragm positioned between an oxygen gas ("$O_2$") sensing chamber and a hydrogen gas ("$H_2$") sensing chamber.

Referring to the drawings in detail, an improved pressure differential regulator of the present invention is shown and generally designated by the reference numeral 10. As best seen in FIG. 1, the pressure differential regulator 10 basically comprises a first sensing chamber 12 that receives a first fluid through a first fluid inlet 14; a second sensing chamber 16 that receives a second fluid through a second fluid inlet 18; a multi-layered diaphragm 20 secured between the first and second sensing chambers 12, 16; a first contracted sensing chamber outflow restriction valve 22 secured within the first sensing chamber 12 adjacent the multi-layered diaphragm 20; a second contracted sensing chamber outflow restriction valve 24, secured within the second sensing chamber 16 adjacent the multi-layered diaphragm 20; a first fluid outlet 26 in fluid communication with the first contracted sensing chamber outflow restriction valve 22 and first sensing chamber 12; a second fluid outlet 28 in fluid communication with the second contracted sensing chamber outflow restriction valve 24 and second sensing chamber 16; a first leakage cavity 30 defined within the multi-layered diaphragm 20; a second leakage cavity 32 also defined within the multi-layered diaphragm 20; a first leakage monitoring device 34 in fluid communication with the first leakage cavity 30; and a second leakage monitoring device 36 in fluid communication with the second leakage cavity 32.

Figure 6:
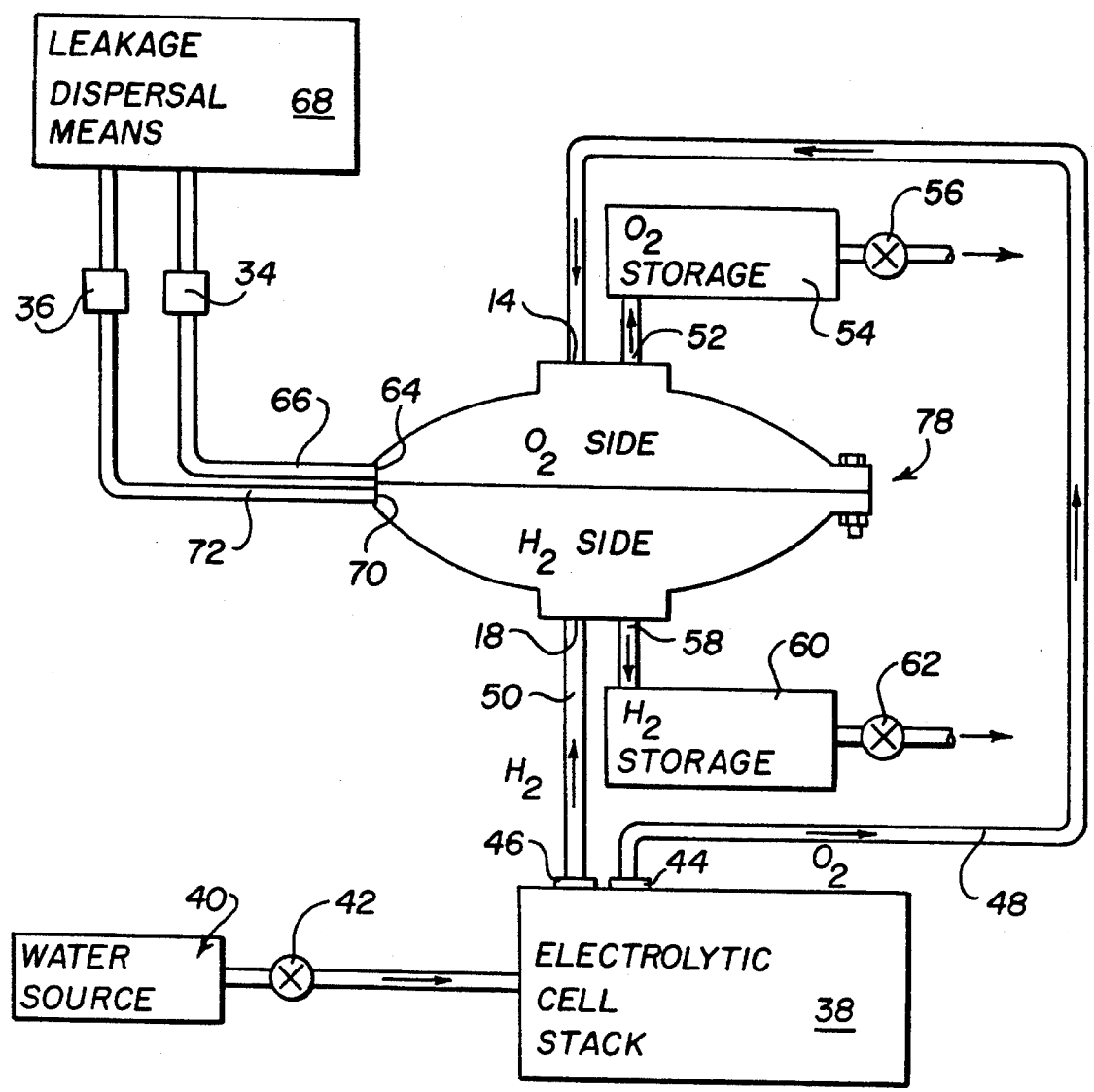
FIG. 6 is a schematic representation of a working environment of the improved, pressure differential regulator of the present invention.

As best seen in FIG. 6, a typical working environment for an improved pressure differential regulator 10 of the present invention is disclosed, and includes a supply source such as an electrolytic cell stack 38 that receives a starting material such as water from a water source 40 and source control valve 42. The electrolytic cell stack 38 produces product fluids (for example diatomic oxygen "$O_2$" and diatomic hydrogen "$H_2$", as shown in FIG. 6) that leave the stack 38 respectively through a first discharge port 44 and a second discharge port 46. The product fluids then separately flow into the pressure differential regulator 10 through a first fluid supply means such as first supply pipe 48 into the first fluid inlet 14, and through a second supply means such as second supply pipe 50 into the second fluid inlet 18. The first fluid then leaves the pressure differential regulator through the first fluid outlet 26 and affixed first fluid outlet pipe 52 into a means for storing the first fluid such as first fluid, or $O_2$ storage tank 54. Discharge of the first fluid out of the first fluid storage tank 54 is controlled by stored first fluid demand valve 56 which may be adjacent the first fluid storage tank 54, as shown in FIG. 6, or upstream of that tank if required by a different working environment. The second fluid likewise leaves the pressure differential regulator through the second fluid outlet 28 and affixed second fluid outlet pipe 58 into a means for storing the second fluid such as second fluid, or $H_2$ storage tank 60. Discharge of the second fluid out of the second fluid storage tank 60 is controlled by stored second fluid demand valve 62 which may be adjacent the second fluid storage tank 60, as shown in FIG. 6, or upstream of that tank if required by a different working environment.

In the event of a leak in the multi-layered diaphragm that permits the first fluid to pass out of the first sensing chamber 12 into the first leakage cavity 30, the leaked first fluid flows through a first leakage fitting 64; a first leakage evacuation means such as first leakage pipe 66; first leakage measuring means for monitoring the rate of flow of the leaked first fluid, such as the first leakage monitoring device 34; and then through an outlet means for dispersing the leaked fluid 68. Similarly, in the event of a leak in the multi-layered diaphragm 20 that permits the second fluid to pass out of the second sensing chamber 16 into the second leakage cavity 32, the leaked second fluid flows through a second leakage fitting 70; a second leakage evacuation means such as second leakage pipe 72; second leakage measuring means for monitoring the rate of flow of the leaked first fluid, such as the second leakage monitoring device 36; and then through the outlet means for dispersing the leaked fluid 68. The outlet means for dispersing the leaked fluid 68 may include first and second leakage dispersal outlets (not shown) situated in opposed remote ceiling corners of an engineering cabin of a vehicle (e.g., submarine, space or aircraft (not shown)) housing the pressure differential regulator 10; or third and fourth leakage dispersal outlets (not shown) on an exterior surface of the vehicle housing the pressure differential regulator 10; so that the leaked first and second fluids cannot mix at rates necessary for negative consequences (e.g., an explosion upon ignition).

The first and second leakage monitoring devices 34 and 36 may comprise valves that are capable of monitoring and communicating the flow rate(s) of the leaked fluids so that an operator (not shown) may terminate usage of the pressure differential regulator 10 in the event of an excess leakage flow rate of either or both fluids.

As seen in FIG. 1, the pressure differential regulator 10 includes a first housing member 74 that defines with the multi-layered diaphragm 20 the first sensing chamber 12, and a second housing member 76 that similarly defines the second sensing chamber 16. The housing members 74, 76 are secured together by securing means such as a plurality of nut and bolt assemblies 78, one of which is shown in FIGS. 1 and 6. Leakage prevention means, such as sealing cavities 80 and 82 and sealing rings 84 and 86 respectively within the cavities defined in the first and second housing members respectively, secure the first and second sensing chambers 12 and 16 against leakage through the first and second housing members 74, 76 when they are secured together.

Figure 2:
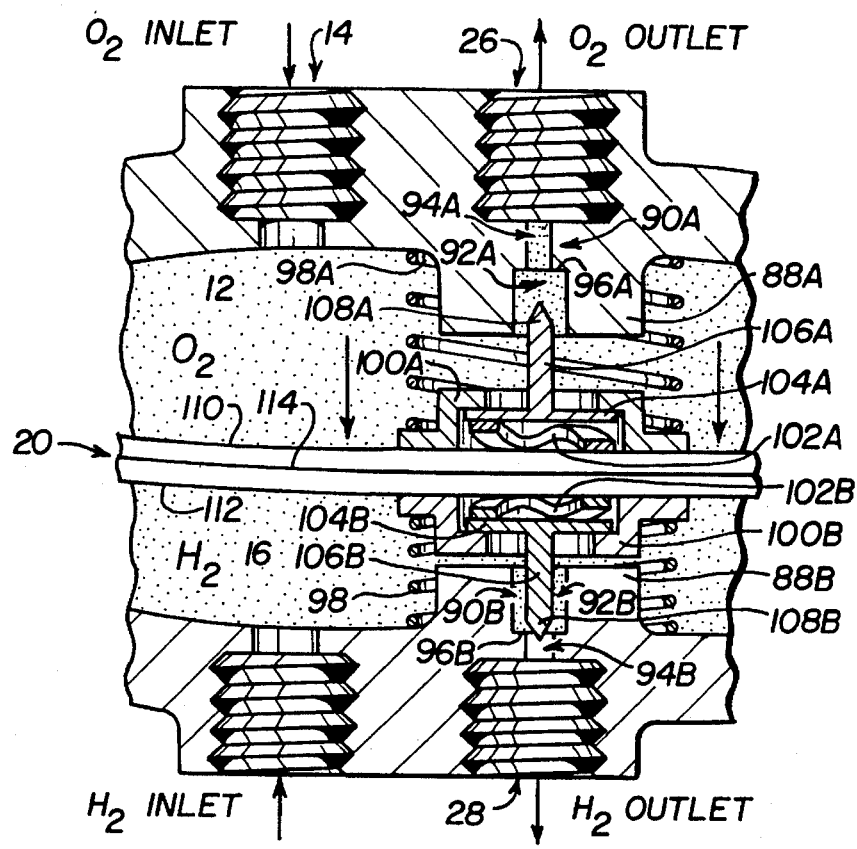
FIG. 2 is a fragmentary view of the FIG. 1 improved pressure differential regulator showing the multi-layered diaphragm expanding into and contracting the hydrogen sensing chamber.
Figure 3:
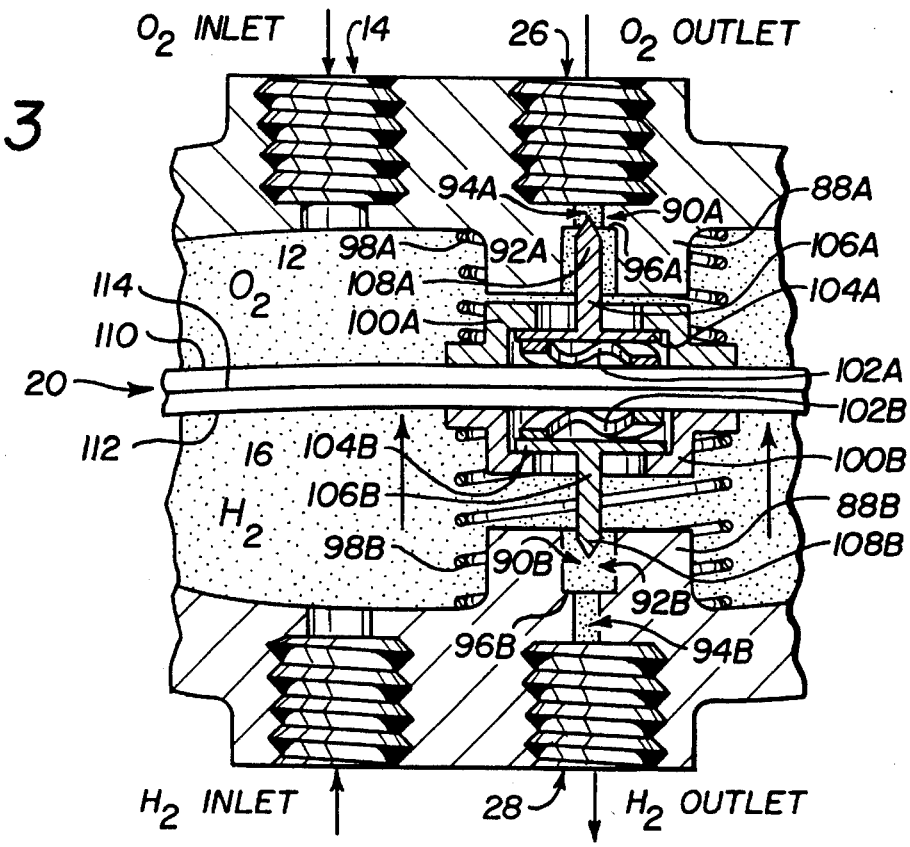
FIG. 3 is similar to FIG. 2, but showing the multi-layered diaphragm expanding into and contracting the oxygen sensing chamber.

The first and second contracted sensing chamber outflow restriction valves 22, 24 (hereinafter occasionally referred to for convenience as "first and second outflow restriction valves 22, 24" or "first and second valves 22, 24") are best shown in FIGS. 2 and 3. (Because the following components of those two valves 22, 24 are identical, their common aspects will hereinafter be described through use of a reference numeral followed by an "A" for the first outflow restriction valve 22 and a "B" for the second outflow restriction valve 24.) A first valve mounting shoulder 88A is defined in the first housing member 74 adjacent the first fluid outlet 26, and a second valve mounting shoulder 88B is defined by the second housing member 76 adjacent the second fluid outlet 28. The valve mounting shoulders 88A, 88B include stepped valve-stem throughbores 90A, 90B, having valve-stem chambers 92A, 92B adjacent the first and second sensing chambers 12, 16, and outlet passages 94A, 94B adjacent the first and second fluid outlets 26, 28, so that first and second fluids may pass through the sensing chambers 12, 16, stepped valve-stem throughbores 90A, 90B, and fluid outlets 26, 28. Valve seal steps 96A, 96b separate the valve-stem chambers 92A, 92B from the outlet passages 94A, 94B.

Valve positioning springs 98A, 98B, surround the first and second valve mounting shoulders 88A, 88B to secure valve clamps 100A, 100B adjacent the multi-layered diaphragm 20. The valve clamps encase load limit springs 102A, 102B, upon which are seated base plates 104A, 104B of valve stems 106A, 108B. The valve stems project through the valve clamps 100A, 100B into the stepped valve-stem throughbores 90A, 90B, so that conical tips 108A, 108B of the valve stems 106A, 106B may adjustably contact the valve seal steps 96A, 96B to seal the stepped valve-stem throughbores 90A, 90B to prohibit passage of fluids out of the first or second sensing chambers 12, 16 into the fluid outlets 26, 28. The load limit springs 102A, 102B prohibit potentially damaging contact between the conical tips 108A, 108B and the valve seal steps 96A, 96B in the event of an extreme movement of the valve stems 106A, 106B, such as during a "lock-up" of the regulator 10 during shipping. The springs 102A, 102B may be low vertical profile springs, such as wave washer springs shown in FIGS. 1–3.

Operation of the first and second contracted sensing chamber outflow restriction valves 22, 24 is best shown in FIGS. 2 and 3 In FIG. 2, the second, or "H$_2$" sensing chamber 16 has been contracted by movement of the multi-layered diaphragm into that chamber 16. Consequently, the valve stem 106B of the second outflow restriction valve 24 has moved into the second stepped valve stem throughbore 90B so that its conical tip 108B has just about contacted the valve seal step 96B of the throughbore 90B to restrict outflow of the fluid in the second sensing chamber 16 through its second fluid outlet 28. At the same time, and by the same motion of the multi-layered diaphragm 20, the first contracted sensing chamber outflow restriction valve 22 has acted to enhance outflow of fluid from the first sensing chamber 12, by movement of the conical tip 108A of its valve stem 106A away from the valve seal step 96A of the first stepped valve stem throughbore 90A. FIG. 3 shows the opposite action of first and second contracted sensing chamber outflow restriction valves 22, 24 as the multi-layered diaphragm 20 moves to contract the first sensing chamber 12, and simultaneously expand the second sensing chamber 16.

While first and second contracted sensing chamber outflow restriction valve 22, 24 have been described herein with particularity, the improved pressure differential regulator 10 includes any valve structures known in the art that can restrict flow out of a sensing chamber, wherein the chamber includes a diaphragm means for contracting or expanding the internal volume of the chamber in response to pressure changes within the chamber, and the valve restricts fluid outflow from the chamber in response to a contraction of the chamber by movement of the diaphragm means. It is therefore intended that the above-described specific structures of valves 22, 24 and other potential embodiments of appropriate valves for the improved pressure differential regulator 10 of the present invention are included within the designations first or second outflow restriction valve means for restricting outflow of fluids from the first or second sensing chambers in response to contraction of internal volumes of the first or second sensing chambers by the diaphragm means.

As shown in FIGS. 1, first and second valve positioning springs 98A, 98B are of equal spring load, so that under equal downstream demands, clearances are approximately the same between the conical tips 108A, 108B of valve stems 106A, 106B and the valve seal steps 96A, 96B in the first and second contracted sensing chamber outflow restriction valves 22, 24. However, the regulator 10 may also be designed to control pressure differentials within fluid systems wherein the outflow pressure of a first fluid may be desired to be different than the outflow pressure of a second fluid. In that event, first valve positioning spring 98A is simply of a different spring load than that of the second valve positioning spring 98B, to bias the diaphragm 20 into either the first or second sensing chamber and thereby adjust for a different desired pressure differential between the first and second sensing chambers. For example, if the spring load of the first positioning spring 98A is different by a set proportion than the spring load of the second positioning spring 98B, a pressure of first fluid inflow to the first sensing chamber 12 will be different than a pressure of second fluid inflow to the second sensing chamber 16 by the same proportion while the diaphragm 20 is stationery, and throughout all of its movement.

It is also pointed out that the positioning springs 98A, 98B afford positioning of the first and second outflow restriction valves 22, 24 adjacent the multi-layered diaphragm 20 without need for any interruption of the diaphragm 20. Not only does that reduce the manufacturing cost of the diaphragm, but it also reduces the likelihood of an alignment structure on or through the diaphragm providing a possible leak point out of the first and or second sensing chambers 12, 16. Further, that feature assists consistent operation of the valves 22, 24 in the event of slight lateral movement of the diaphragm, as through shipping prior to or between usage, or through uneven lateral movement of any components of the diaphragm 20 resulting from uneven thermal expansion during ordinary usage. That structural relationship between the valves 22, 24 and the multi-layered diaphragm 20 will hereafter be characterized as the valves 22, 24 being in adjacent and unsecured association with the multi-layered diaphragm 20.

As seen in FIG. 1, the multi-layered diaphragm 20 defines a first leakage cavity 30 and a second leakage cavity 32. The multi-layered diaphragm 20 includes a first outer layer 110 that is adjacent to and defines at least a portion of the first sensing chamber 12; a second outer layer 112 that is adjacent to and defines at least a portion of the second sensing chamber 16; and a central layer 114 between the first and second outer layers 110, 112. In a preferred embodiment, the first and second outer layers 110, 112 and central layer 114 are made of a thin metal such as stainless steel or other suitable metals that can resist corrosion characteristics of the first and second fluids, and that have suitable strength for tolerating system operating pressures. First outer layer 110 is sealed to first housing member 74 by sealing ring 84 to seal the first sensing chamber 12 against leakage, and second outer layer 112 is sealed to second housing member 76 by sealing ring 86 to seal the second sensing chamber 16.

Figure 4:
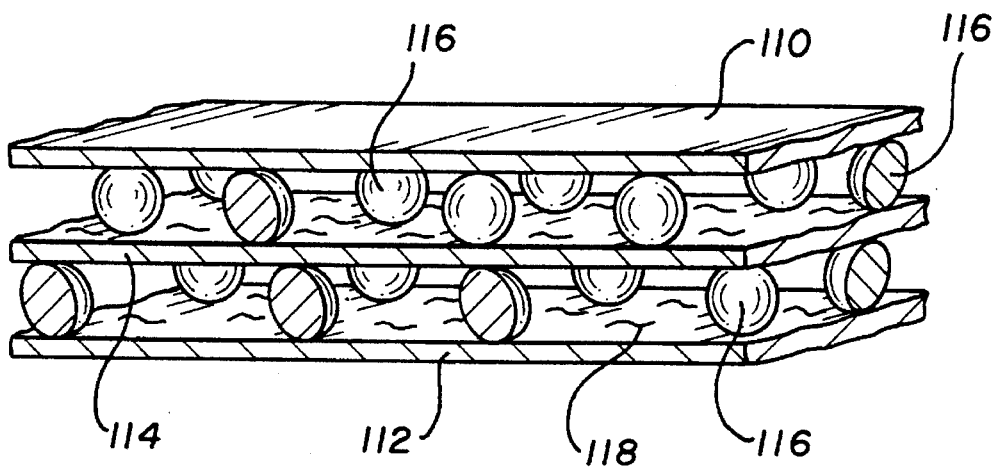
FIG. 4 is a fragmentary cross-sectional of the multi-layered diaphragm of FIG. 1, showing the multiple layers separated by a plurality of spheres to define leakage cavities.
Figure 5:
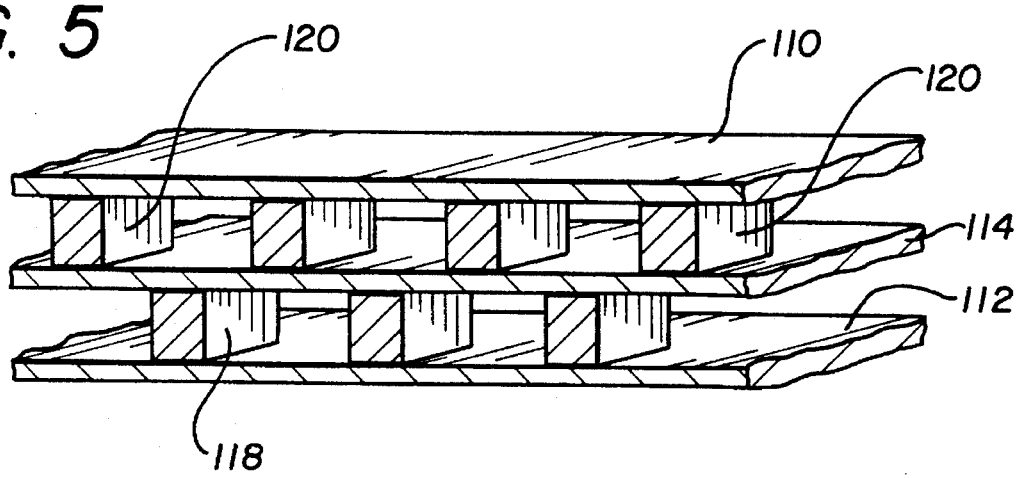
FIG. 5 is similar to FIG. 4, but showing a plurality of projecting bodies separating the layers.

The first leakage cavity 30 is defined between the first outer layer 110 and the central layer 114 of the diaphragm 20, while the second leakage cavity 32 is defined between the second outer layer 112 and the central layer 114. A leakage cavity separation means is disposed within the first and second leakage cavities 30, 32 for preventing the first outer layer 110 or the second outer layer 112 from collapsing upon the central layer 114 and thereby interrupting or closing the leakage cavities. The leakage cavity separation means may take the form of any structure that can: separate the first and second outer layers 110, 112; not significantly restrict movement of the multi-layered diaphragm 20 in response to pressure changes in the first or second sensing chambers 12, 16; and also permit free flow of fluids through the leakage cavities 30, 32 to the first and second leakage fittings 64, 70. FIGS. 4 and 5 show exemplary alternative embodiments of such leakage cavity separation means. In FIG. 4, a plurality of spheres 116 are shown secured with a thin layer of flexible adhesive 118 between the first outer layer 110, central layer 114, and second outer layer 112. The adhesive 118 may be of a variety of types well known in the art, such as a room temperature vulcanizing ("RTV") elastomer. In FIG. 5, a plurality of randomly placed projecting bodies 120 are secured between the first outer layer 110, central layer 114, and second outer layer 112. For ease of manufacturing, the projecting bodies 120 may be integral with only opposed exterior surfaces the central layer 14. It is pointed out that the leakage cavity separation means permits lateral movement of the first outer layer 110, central layer 114 and second outer layer 112 relative to each other to minimize mechanical stresses when the multi-layered diaphragm extends transversely into the respective first or second sensing chambers 12, 16, as shown in FIGS. 2 and 3. Additional leakage cavity separation means structures may include woven wire screens (not shown), or a flat plates that define integral flow passages (not shown).

Additionally, the outlet means for dispersing the leaked fluids 68 and the first and second leakage measuring means 34, 36 cooperate to ensure there is no resistance to the flow of leaked fluids into and out of the leakage cavities 30, 32 from the first or second sensing chambers 12, 16, and that pressures within first and second leakage pipes 66, 72 are approximately the same. Therefore, even in the event of a failure in the central layer 114 along with failures in the first and second outer layers 110, 112, fluid leaked from the first sensing chamber 12 would not pass through the failure in the central layer to mix with fluid leaked from the second sensing chamber 16 because the path of lower pressure, or of least resistance for each fluid would be out of the leakage cavity through the first and second leakage pipes 66, 72 to the first and second leakage measuring means 34, 36, and on to dispersal out the outlet means for dispersing the leaked fluids 68 at equal pressures.

While the present invention has been described and illustrated with respect a particular construction and within a particular working environment, it will be understood by those skilled in the art that the present invention is not limited to this particular example. Accordingly, reference should be made primarily to the attached claims rather than the foregoing specification to determine the scope of the invention.

I claim:

1. A pressure differential regulator for controlling pressure differentials within a supply source that supplies at least a first fluid and a second fluid at differing pressures through first and second discharge ports, comprising:

a. a first sensing chamber in fluid communication with the first discharge port for receiving the first fluid;

b. a second sensing chamber in fluid communication with the second discharge port for receiving the second fluid;

c. a diaphragm means for separating the first and second sensing chambers;

d. a first outflow restriction valve means affixed adjacent a first surface of the diaphragm means within the first sensing chamber for restricting outflow of fluids through a first fluid outlet out of the first sensing chamber in response to contraction of an internal volume of the first sensing chamber by the diaphragm means; and e. a second outflow restriction valve means affixed adjacent an opposed second surface of the diaphragm means within the second sensing chamber for restricting outflow of fluids through a second fluid outlet out of the second sensing chamber in response to contraction of an internal volume of the second sensing chamber by the diaphragm means, so that, whenever the diaphragm means expands into and contracts the internal volume of the first sensing chamber, the first outflow restriction valve means restricts flow out of the first fluid outlet while the second outflow restriction valve means simultaneously enhances flow out of the second fluid outlet, and whenever the diaphragm means expands into and contracts the internal volume of the second sensing chamber, the second outflow restriction valve means restricts flow out of the second fluid outlet while the first outflow restriction valve means simultaneously enhances flow out of the first fluid outlet.

2. The pressure differential regulator of claim 1, wherein the first outflow restriction valve means comprises a first contracted sensing chamber outflow restriction valve, and the second outflow restriction valve means comprises a second contracted sensing chamber outflow restriction valve, each contracted sensing chamber outflow restriction valve including a stepped valve-stem throughbore defined within a valve mounting shoulder of a regulator housing member, the throughbore being in fluid communication with its adjacent sensing chamber and fluid outlet; a valve seal step defined within the valve-stem throughbore; a valve stem having a base plate secured adjacent a surface of the diaphragm means by a valve clamp so that the valve stem projects into the stepped valve-stem throughbore to adjustably control rates of flow of the fluids through the throughbore and adjacent fluid outlet upon movement of the diaphragm, and to prohibit passage of the fluid out of the throughbore upon contact of a conical tip of the valve stem with the valve seal step.

3. The pressure differential regulator of claim 2, wherein the first contracted sensing chamber outflow restriction valve includes a first positioning spring that secures the first valve between the first surface of the diaphragm means and the first fluid outlet, and the second contracted sensing chamber outflow restriction valve includes a second positioning spring that secures the first valve between the second surface of the diaphragm means and the second fluid outlet, so that, whenever the spring load of the first positioning spring is different by a set proportion than the spring load of the second positioning spring, a pressure of first fluid inflow to the first sensing chamber will be different than a pressure of second fluid inflow to the second sensing chamber by the same proportion.

4. The pressure differential regulator of claim 3, wherein each contracted sensing chamber outflow restriction valve also includes a load limit spring means positioned between the base plate of the valve stem and surface of the diaphragm for limiting abrupt contact between the conical tip of the valve stem and the valve seal step.

5. The pressure differential regulator of claim 1, wherein the first and second outflow restriction valve means are in adjacent and unsecured association with the diaphragm means.

6. A pressure differential regulator for controlling pressure differentials within a supply source that supplies a first fluid and a second fluid at differing pressures through first and second discharge ports, comprising:

a. a first sensing chamber in fluid communication with the first discharge port for receiving the first fluid;

b. a second sensing chamber in fluid communication with the second discharge port for receiving the second fluid;

c. a multi-layered diaphragm for separating the first and second sensing chambers;

d. a first outflow restriction valve means affixed adjacent a first outer layer of the diaphragm within the first sensing chamber for restricting outflow of fluids through a first fluid outlet out of the first sensing chamber in response to contraction of an internal volume of the first sensing chamber by the diaphragm;

e. a second outflow restriction valve means affixed adjacent an opposed second outer layer of the diaphragm within the second sensing chamber for restricting outflow of fluids through a second fluid outlet out of the second sensing chamber in response to contraction of an internal volume of the second sensing chamber by the diaphragm;

f. a first leakage measuring means, in fluid communication with a first leakage cavity defined within the multi-layered diaphragm, for measuring flow of leaked first fluid passing through the first outer layer of the diaphragm into the first leakage cavity and on out of the regulator through a first leakage evacuation means; and g. a second leakage measuring means, in fluid communication with a second leakage cavity defined within the multi-layered diaphragm, for measuring flow of leaked second fluid passing through the second outer layer of the diaphragm into the second leakage cavity and on out of the regulator through a second leakage evacuation means.

7. The pressure differential regulator of claim 6, further comprising an outlet means for dispersing leaked fluids, in fluid communication with the first and second leakage measuring means, the outlet means including a plurality of outlets to prevent unsafe mixing of the leaked fluids.

8. The pressure differential regulator of claim 7, wherein the multi-layered diaphragm defines the first leakage cavity between a central layer and the first outer layer, and also defines the second leakage cavity between the central layer and the second outer layer, and a leakage cavity separation means is disposed within the first and second leakage cavities for preventing the first outer layer or the second outer layer from collapsing upon the central layer.

9. The pressure differential regulator of claim 8, wherein the leakage cavity separation means comprises a plurality of spheres that are positioned between the first outer layer and the central layer, and between the second outer layer and the central layer, and the spheres are secured to the layers against random movement by an adhesive.

10. The pressure differential regulator of claim 8 wherein the leakage cavity separation means comprises a plurality of projecting bodies positioned between the first outer layer and the central layer, and between the second outer layer and the central layer.

11. A pressure differential regulator for controlling pressure differentials within an electrolytic cell that supplies a first fluid and a second fluid at differing pressures through first and second discharge ports, comprising:

a. a first sensing chamber in fluid communication with the first discharge port for receiving the first fluid;

b. a second sensing chamber in fluid communication with the second discharge port for receiving the second fluid;

c. a multi-layered diaphragm for separating the first and second sensing chambers, wherein the multi-layered diaphragm defines a first leakage cavity between a first outer layer and a central layer, and defines a separate second leakage cavity between a second outer layer and the central layer, so that any first fluid leaked through the first outer layer passes through the first leakage cavity out of the regulator, and any second fluid leaked through the second outer layer passes through the second leakage cavity out of the regulator;

d. a first contracted sensing chamber outflow restriction valve affixed adjacent the first outer layer of the multi-layered diaphragm that restricts outflow of the first fluid through a first fluid outlet out of the first sensing chamber in response to contraction of an internal volume of the first sensing chamber by the multi-layered diaphragm; and e. a second contracted sensing chamber outflow restriction valve affixed adjacent the second outer layer of the multi-layered diaphragm that restricts outflow of the second fluid through a second fluid outlet out of the second sensing chamber in response to contraction of an internal volume of the first sensing chamber by the multi-layered diaphragm, so that, whenever the multi-layered diaphragm expands into and contracts the internal volume of the first sensing chamber, the first contracted sensing chamber outflow restriction valve restricts flow out of the first fluid outlet while the second contracted sensing chamber outflow restriction valve simultaneously enhances flow out of the second fluid outlet, and whenever the multi-layered diaphragm expands into and contracts the internal volume of the second sensing chamber, the second contracted sensing chamber outflow restriction valve restricts flow out of the second fluid outlet while the first contracted sensing chamber outflow restriction valve simultaneously enhances flow out of the first fluid outlet.

12. The pressure differential regulator of claim 11, wherein the first contracted sensing chamber outflow restriction valve is in adjacent and unsecured association with the first outer layer of the multi-layered diaphragm, and the second contracted sensing chamber outflow restriction valve is in adjacent and unsecured association with the second outer layer of the multi-layered diaphragm.

13. The pressure differential regulator of claim 12, further comprising:

a. a first leakage monitoring device, in fluid communication with the first leakage cavity, that measures flow of any first fluid leaked through the first outer layer of the diaphragm into the first leakage cavity and on out of the regulator; and b. a second leakage monitoring device, in fluid communication with the second leakage cavity, that measures flow of any second fluid leaked through the second outer layer of the diaphragm into the second leakage cavity and on out of the regulator.

14. The pressure differential regulator of claim 13, further comprising an outlet means for dispersing leaked fluids, in fluid communication with the first and second leakage monitoring devices, the outlet means including a plurality of outlets to prevent unsafe mixing of the leaked fluids.

15. The pressure differential regulator of claim 14, further comprising a leakage cavity separation means disposed within the first and second leakage cavities for preventing the first outer layer or the second outer layer from collapsing upon the central layer.

16. The pressure differential regulator of claim 15, wherein the leakage cavity separation means comprises a plurality of spheres that are positioned between the first outer layer and the central layer, and between the second outer layer and the central layer, and the spheres are secured to the layers against random movement by an adhesive.

17. The pressure differential regulator of claim 15 wherein the leakage cavity separation means comprises a plurality of projecting bodies positioned between the first outer layer and the central layer, and between the second outer layer and the central layer.

18. The pressure differential regulator of claim 15 wherein the leakage cavity separation means comprises a woven wire screen positioned between the first outer layer and the central layer, and between the second outer layer and the central layer.

19. The pressure differential regulator of claim 15 wherein the leakage cavity separation means comprises a flat plate that defines integral flow passages positioned between the first outer layer and the central layer, and between the second outer layer and the central layer.

* * * * *